(12) United States Patent
Hicks

(10) Patent No.: US 10,890,116 B2
(45) Date of Patent: Jan. 12, 2021

(54) FUEL INJECTOR, A COMBUSTION CHAMBER COMPRISING A FUEL INJECTOR AND A METHOD OF DETECTING COKING IN A COMBUSTION CHAMBER FUEL INJECTOR

(71) Applicant: ROLLS-ROYCE plc, London (GB)

(72) Inventor: Robert A Hicks, Derby (GB)

(73) Assignee: ROLLS-ROYCE PLC, London (GB)

( * ) Notice: Subject to any disclaimer, the term of this patent is extended or adjusted under 35 U.S.C. 154(b) by 147 days.

(21) Appl. No.: 16/287,223

(22) Filed: Feb. 27, 2019

(65) Prior Publication Data

US 2019/0292996 A1 Sep. 26, 2019

(30) Foreign Application Priority Data

Mar. 26, 2018 (GB) .................................. 1804814.0

(51) Int. Cl.
*F02C 9/28* (2006.01)
*F02C 7/22* (2006.01)

(52) U.S. Cl.
CPC .................. *F02C 9/28* (2013.01); *F02C 7/22* (2013.01); *F05D 2270/804* (2013.01)

(58) Field of Classification Search
CPC ......... F02C 9/28; F02C 7/22; F05D 2270/804
See application file for complete search history.

(56) References Cited

U.S. PATENT DOCUMENTS

| | | | |
|---|---|---|---|
| 5,367,869 A | 11/1994 | DeFreitas | |
| 5,578,828 A | 11/1996 | Brown et al. | |
| 8,371,102 B1 | 2/2013 | Lee et al. | |
| 2015/0113942 A1* | 4/2015 | Hockaday | G01K 13/02 60/226.1 |
| 2016/0083852 A1* | 3/2016 | Clark | C23F 1/12 60/752 |
| 2016/0084637 A1* | 3/2016 | John | F01D 11/14 250/206 |

FOREIGN PATENT DOCUMENTS

| | | |
|---|---|---|
| EP | 1593910 A1 | 11/2005 |
| EP | 1764554 A1 | 3/2007 |
| EP | 1944546 A2 | 7/2008 |

OTHER PUBLICATIONS

Aug. 13, 2019 Combined Search and Examination Report issued in British Patent Application No. 1902565.9.
Sep. 24, 2018 Search Report issued in British Patent Application No. 1804814.0.

* cited by examiner

*Primary Examiner* — Steven M Sutherland
(74) *Attorney, Agent, or Firm* — Oliff PLC

(57) ABSTRACT

A fuel injector comprises a fuel feed arm and a fuel injector head and the fuel injector head has a fuel passage. The fuel feed arm has a fuel supply passage in fluid communication with the fuel passage in the fuel injector head. A first light guide extends through the fuel feed arm and has a distal end arranged to direct light into the fuel passage in the fuel injector head. A light source is arranged to supply light into a proximal end of the first light guide. A second light guide extends through the fuel feed arm and has a distal end arranged to receive transmitted light in the fuel passage in the fuel injector head and a light receiver is arranged to collect light at a proximal end of the second light guide.

20 Claims, 5 Drawing Sheets

FUEL INJECTOR, A COMBUSTION CHAMBER COMPRISING A FUEL INJECTOR AND A METHOD OF DETECTING COKING IN A COMBUSTION CHAMBER FUEL INJECTOR

The present disclosure relates to a fuel injector, a combustion chamber comprising a fuel injector and a method of detecting coking in a combustion chamber fuel injector and in particular to a gas turbine engine fuel injector, a gas turbine engine combustion chamber comprising a fuel injector and a method of detecting coking in a gas turbine engine combustion chamber fuel injector.

Fuel injectors in a combustion chamber of a gas turbine engine operate at high temperatures and any fuel in fuel passages within the fuel injector are susceptible to coke formation, or coking, if the fuel is stagnant for a period of time or if the temperature of the fuel remains at a high temperature for a period of time. For example a lean burn fuel injector has a pilot fuel injector and a main fuel injector and the main fuel injector is only operated at high power conditions and thus fuel may be stagnant within the fuel passages if the main fuel injector at lower power conditions.

The present disclosure seeks to provide a fuel injector, a combustion chamber comprising a fuel injector and a method of detecting coking in a combustion chamber fuel injector which overcomes or reduces the above mentioned problem.

According to a first aspect there is provided a fuel injector comprising a fuel feed arm and a fuel injector head, the fuel injector head having a fuel passage, the fuel feed arm having a fuel supply passage in fluid communication with the fuel passage in the fuel injector head, a first light guide extending through the fuel feed arm and having a distal end arranged to direct light into the fuel passage in the fuel injector head, a second light guide extending through the fuel feed arm and having a distal end arranged to receive light in the fuel passage in the fuel injector head, in operation a proximal end of the first light guide being connectable to a light source arranged to supply light and a proximal end of the second light guide being connectable to a light receiver.

The fuel passage in the fuel injector head may be an annular fuel passage.

The fuel injector may be an internal combustion engine fuel injector, e.g. a gas turbine engine fuel injector, a petrol engine fuel injector, a diesel engine fuel injector or a Wankel engine fuel injector.

According to a second aspect there is provided a combustion chamber having a fuel injector, the fuel injector comprising a fuel feed arm and a fuel injector head, the fuel injector head having a fuel passage, the fuel feed arm having a fuel supply passage in fluid communication with the fuel passage in the fuel injector head, a first light guide extending through the fuel feed arm and having a distal end arranged to direct light into the fuel passage in the fuel injector head, a second light guide extending through the fuel feed arm and having a distal end arranged to receive light transmitted through the fuel passage in the fuel injector head from the distal end of the first light guide, a light source arranged to supply light to a proximal end of the first light guide and a light receiver arranged to collect light at a proximal end of the second light guide.

The fuel passage in the fuel injector head may be an annular fuel passage.

The light receiver may be a photo-electric device arranged to convert the received light into an electrical signal.

A recorder may be arranged to record the electrical signal.

A processor may be arranged to measure the amplitude of the electrical signal corresponding to the light received by the second light guide.

The processor arranged to compare the amplitude of the electrical signal corresponding to the light received by the second light guide with a datum amplitude.

The processor may be arranged to monitor the amplitude of the electrical signal corresponding to the light received by the second light guide, the processor is arranged to detect a reduction in the amplitude of the electrical signal corresponding to the light received by the second light guide due to coking in the fuel injector.

The fuel injector may be a gas turbine fuel injector.

The gas turbine engine fuel injector may be an air blast fuel injector.

The gas turbine engine fuel injector may be a rich burn fuel injector.

The rich burn fuel injector comprising:
  a fuel feed arm having a fuel supply passage extending there-through,
  a fuel injector head having an air-blast fuel injector, the air-blast fuel injector comprising, in order radially outwardly, a coaxial arrangement of an inner air swirler passage and an outer air swirler passage, an annular fuel passage being arranged to supply fuel into the inner air swirler passage and/or into the outer air swirler passage.

The inner air swirler passage and the outer air swirler passages may each have an axial flow air swirler or the inner air swirler passage and the outer air swirler passages may each have a radial flow air swirler.

The fuel injector may be a lean burn fuel injector.

The lean burn fuel injector comprising:
  a fuel feed arm having a pilot fuel supply passage extending there-through and a main fuel supply passage extending there-through,
  a fuel injector head having a coaxial arrangement of an inner pilot air-blast fuel injector and an outer main air-blast fuel injector, the outer main air-blast fuel injector being arranged coaxially radially outwardly of the inner pilot air-blast fuel injector,
  the inner pilot air-blast fuel injector comprising, in order radially outwardly, a coaxial arrangement of a pilot inner air swirler passage and a pilot outer air swirler passage, an annular pilot fuel passage being arranged to supply pilot fuel into the pilot inner air swirler passage and/or into the pilot outer air swirler passage,
  the outer main air-blast fuel injector comprising, in order radially outwardly, a coaxial arrangement of a main inner air swirler passage and a main outer air swirler passage, an annular main fuel passage being arranged to supply main fuel to the main inner air swirler passage and/or the main outer air swirler passage.

The pilot inner air swirler passage, the pilot outer air swirler passage, the main inner air swirler passage and the main outer air swirler passages may each have an axial flow air swirler. The pilot inner air swirler passage, the pilot outer air swirler passage, the main inner air swirler passage and the main outer air swirler passages may each have a radial flow air swirler.

The first light guide may have a distal end arranged to direct light into the annular main fuel passage in the fuel injector head and the second light guide having a distal end arranged to receive light in the annular main fuel passage.

The first light guide may have a distal end arranged to direct light into the annular pilot fuel passage in the fuel injector head and the second light guide having a distal end arranged to receive light in the annular pilot fuel passage.

The lean burn fuel injector may have a first light guide extending through the fuel feed arm and having a distal end arranged to direct light into the annular main fuel passage in the fuel injector head, a first light source arranged to supply light into a proximal end of the first light guide, a second light guide extending through the fuel feed arm and having a distal end arranged to receive light in the annular main fuel passage and a first light receiver arranged to collect light at a proximal end of the second light guide, a third light guide extending through the fuel feed arm and having a distal end arranged to direct light into the annular pilot fuel passage in the fuel injector head, a second light source arranged to supply light into a proximal end of the third light guide, a fourth light guide extending through the fuel feed arm and having a distal end arranged to receive light in the annular pilot fuel passage and a second light receiver arranged to collect light at a proximal end of the fourth light guide.

According to a third aspect there is provided a method of detecting coking in a fuel injector, wherein the fuel injector being arranged in a combustion chamber, the fuel injector comprising a fuel feed arm and a fuel injector head, the fuel injector head having a fuel passage, the fuel feed arm having a fuel supply passage in fluid communication with the fuel passage in the fuel injector head, the method comprising directing light into the fuel passage in the fuel injector head, detecting light transmitted through the fuel passage in the fuel injector head and monitoring the light transmitted through the fuel passage in the fuel injector head to detect coking in the fuel injector.

The method may comprise converting the received light to an electrical signal.

The method may comprise recording the electrical signal.

The method may comprise measuring the amplitude of the electrical signal corresponding to the light received by the second light guide.

The method may comprise comparing the amplitude of the electrical signal corresponding to the light received by the second light guide with a datum amplitude.

The method may comprise monitoring the amplitude of the electrical signal corresponding to the light received by the second light guide, detecting a reduction in the amplitude of the electrical signal corresponding to the light received by the second light guide due to coking in the fuel injector.

The method may comprise determining if the amplitude of the electrical signal corresponding to the light received by the second light guide is less than the datum amplitude and removing the fuel injector from the combustion chamber if the amplitude of the electrical signal is less than the datum amplitude.

The fuel injector may be an internal combustion engine fuel injector, e.g. a gas turbine engine fuel injector, a petrol engine fuel injector, a diesel engine fuel injector or a Wankel engine fuel injector.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
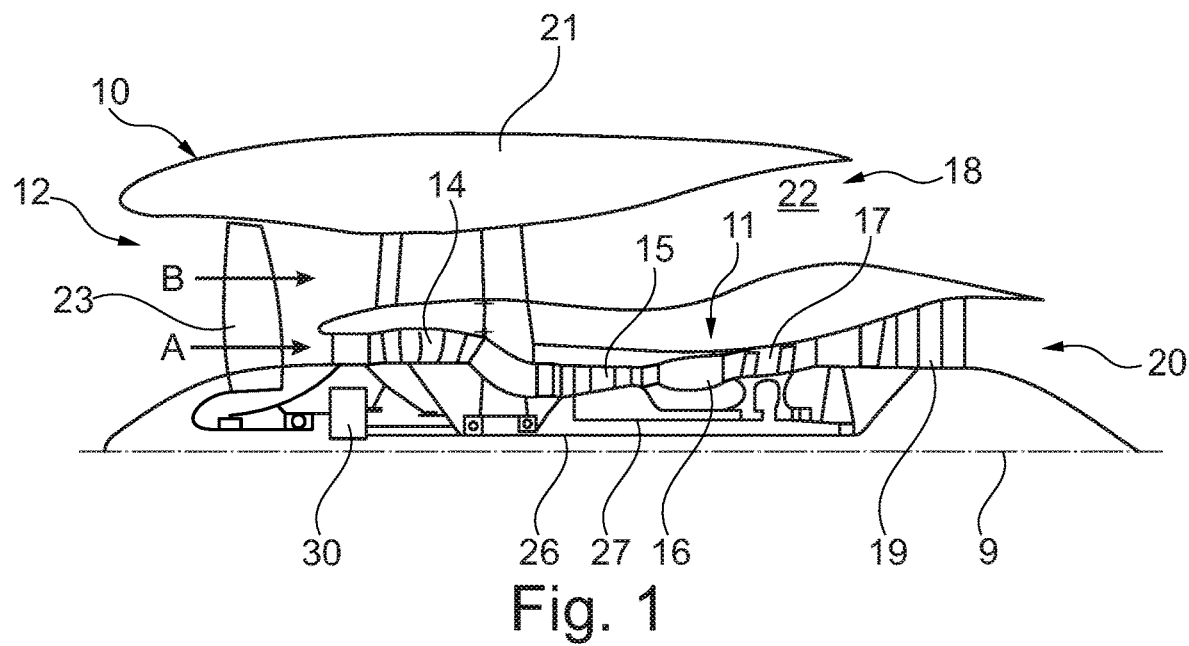
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
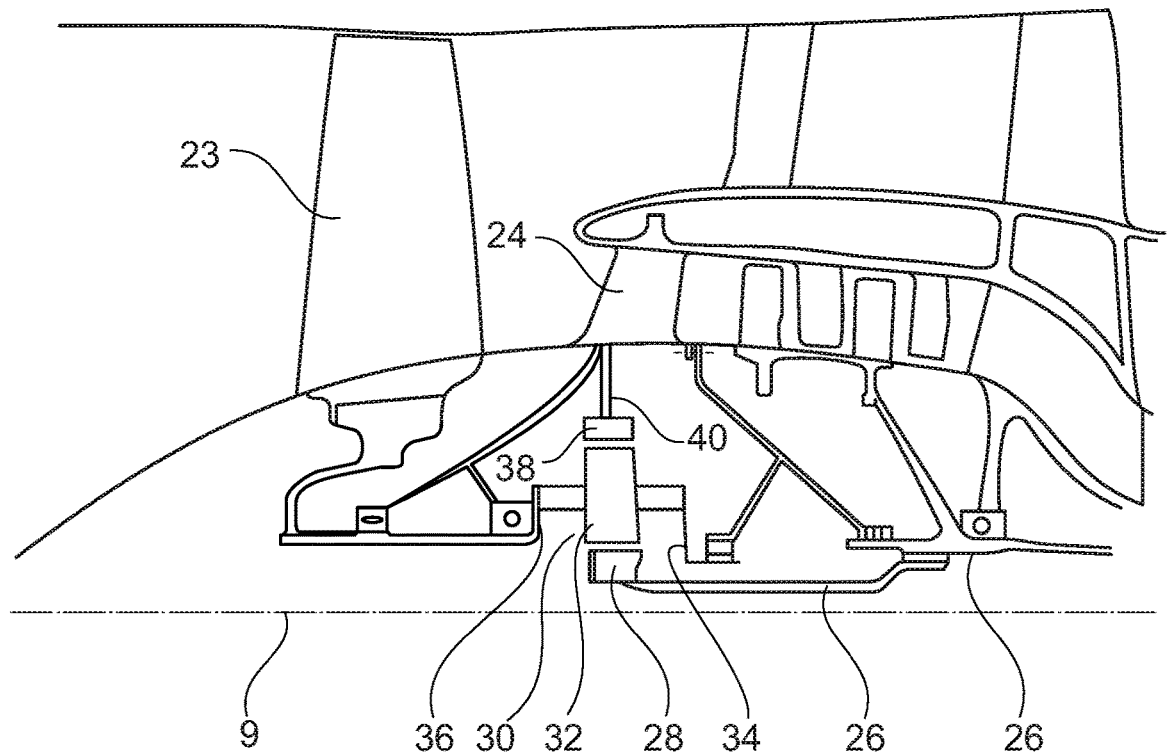
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
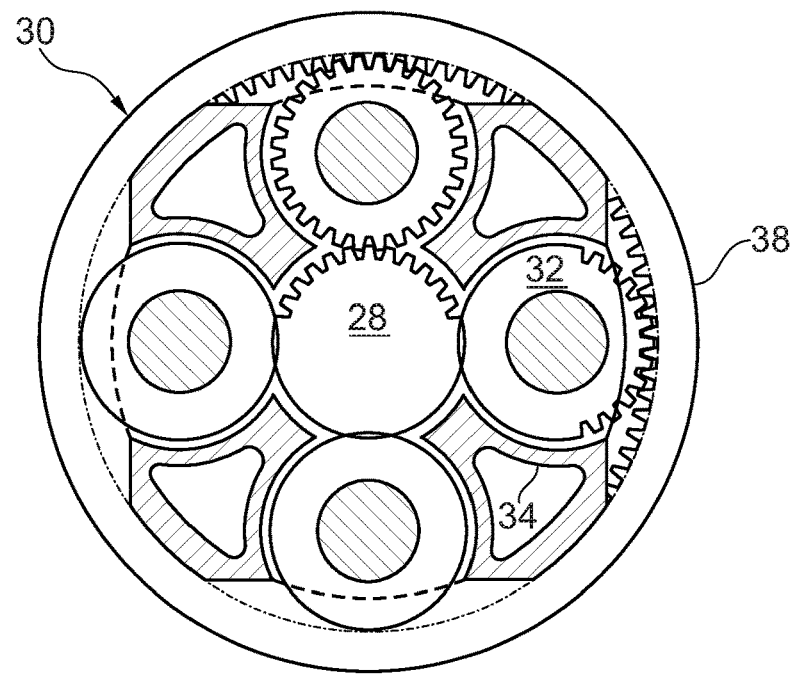
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
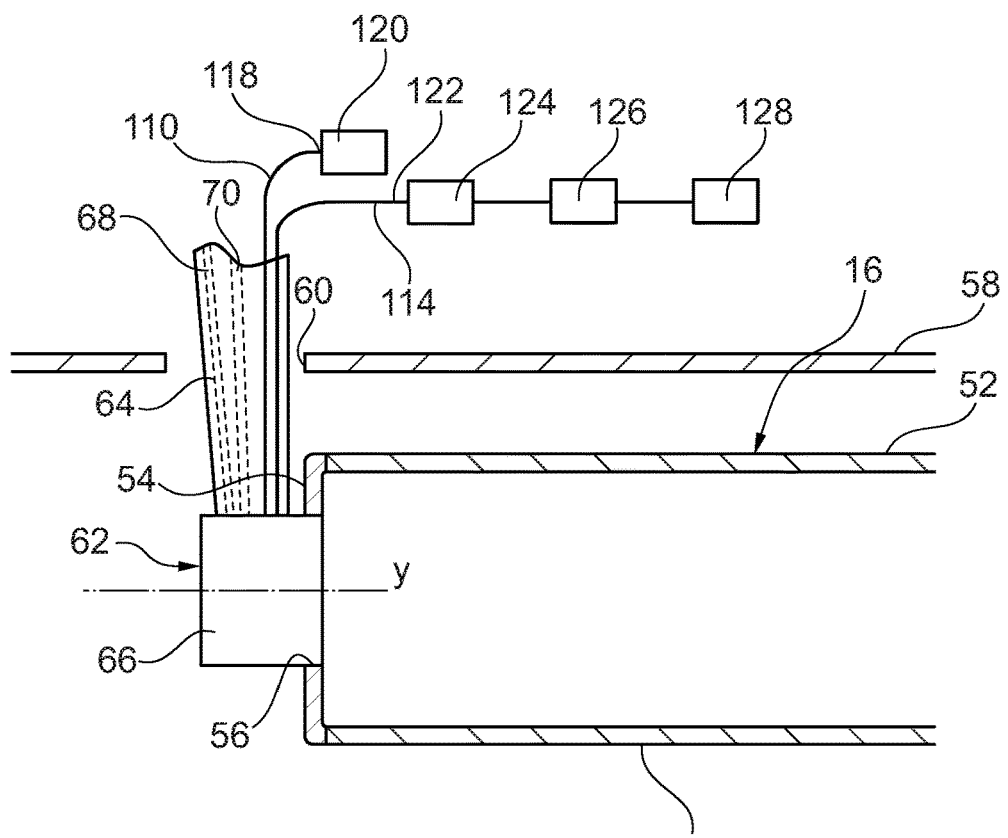
FIG. 4 is an enlarged cross-sectional view of an annular combustion chamber of the gas turbine engine.

The combustion chamber 16 is shown more clearly in FIG. 4. The combustion chamber 16 is an annular combustion chamber and comprises an inner annular wall 50, an outer annular wall 52 and an upstream wall 54. The upstream end wall 54 has a plurality of circumferentially spaced apertures, for example equi-circumferentially spaced apertures, 56. The combustion chamber 16 is surrounded by a combustion chamber casing 58 and the combustion chamber casing 58 has a plurality of circumferentially spaced apertures 60. The combustion chamber 16 also has a plurality of fuel injectors 62 and each fuel injector 62 extends radially through a corresponding one of the apertures 60 in the combustion chamber casing 58 and locates in a corresponding one of the apertures 56 in the upstream end wall 54 of the combustion chamber 16 to supply fuel into the combustion chamber 16.

Figure 5:
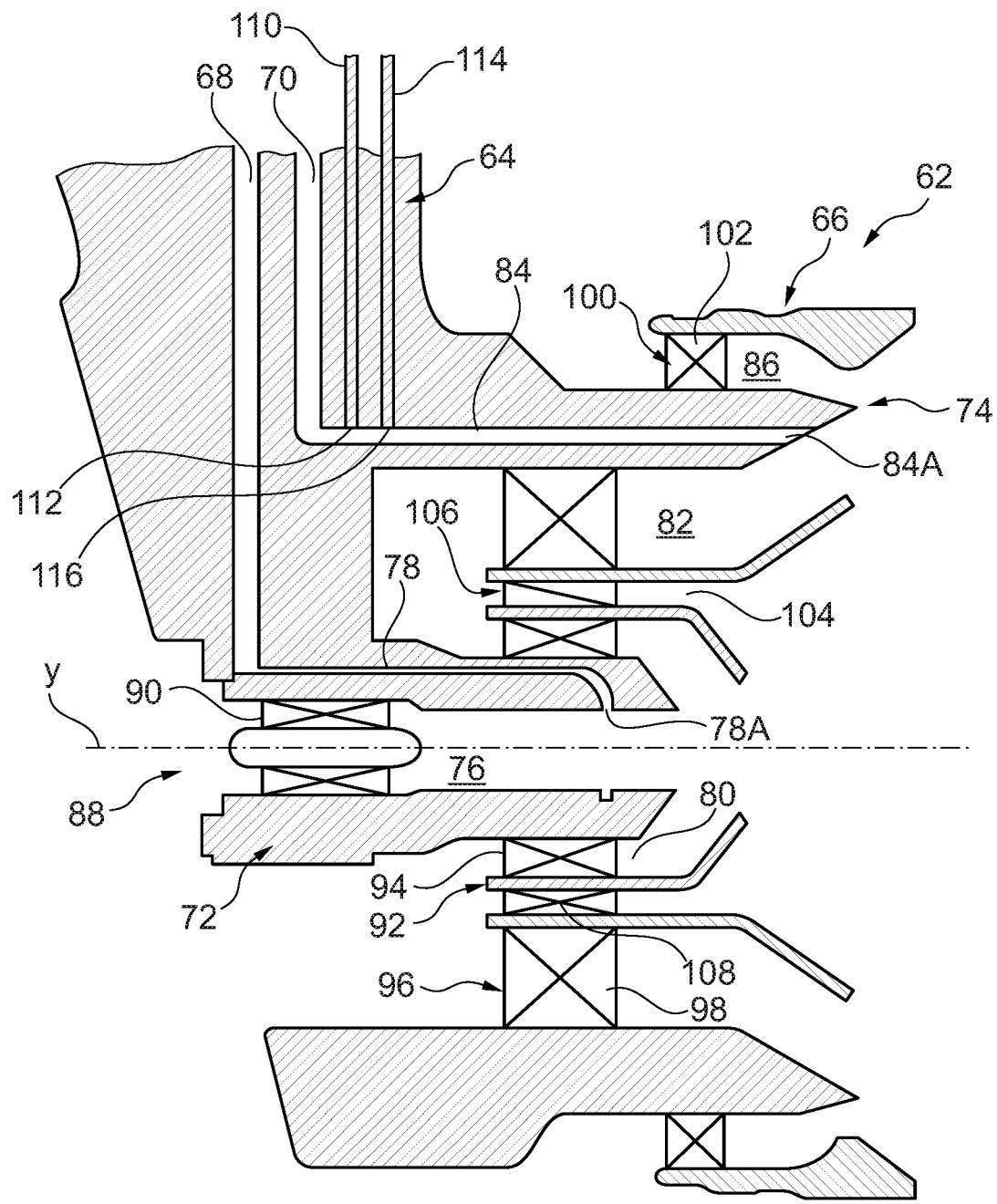
FIG. 5 is a further enlarged cross-section view of a lean burn fuel injector according to the present disclosure.

A fuel injector, in this example a lean burn fuel injector, 62 according to the present disclosure is shown more clearly in FIG. 5. The lean burn fuel injector 62 comprises a fuel feed arm 64 and a fuel injector head 66. The fuel feed arm 64 has a first internal fuel passage, a pilot fuel supply passage, 68 for the supply of pilot fuel to the fuel injector head 66 and a second internal fuel passage, a main supply fuel passage, 70 for the supply of main fuel to the fuel injector head 66. The fuel injector head 66 has an axis Y and the fuel feed arm 64 extends generally radially with respect to the axis Y of the fuel injector head 66 and also generally radially with respect to the axis X of the turbofan gas turbine engine 10. The axis Y of each fuel injector head 66 is generally aligned with the axis of the corresponding aperture 56 in the upstream end wall 54 of the combustion chamber 16.

The fuel injector head 66 has a coaxial arrangement of an inner pilot air-blast fuel injector 72 and an outer main air-blast fuel injector 74. The inner pilot air-blast fuel injector 72 comprises, in order radially outwardly, a coaxial arrangement of a pilot inner air swirler passage 76, a pilot fuel passage 78 and a pilot outer air swirler passage 80. The outer main air-blast fuel injector 74 comprises, in order radially outwardly, a coaxial arrangement of a main inner air swirler passage 82, a main fuel passage 84 and a main outer air swirler passage 86. An intermediate air swirler passage 104 is sandwiched between the pilot outer air swirler passage 80 of the inner pilot air-blast fuel injector 72 and the main inner air swirler passage 82 of the outer main air-blast fuel injector 74.

The pilot inner air swirler passage 76 has a swirler 88 which comprises a plurality of swirl vanes 90 and the pilot outer air swirler passage 80 has a swirler 92 which comprises a plurality of swirl vanes 94. The main inner air swirler passage 82 has a swirler 96 which comprises a plurality of swirl vanes 98 and the main outer air swirler passage 86 has a swirler 100 which comprises a plurality of swirl vanes 102. The intermediate air swirler passage 104 has a swirler 106 which comprises a plurality of swirl vanes 108.

The pilot fuel supply passage 68 in the fuel feed arm 64 supplies pilot fuel to the annular pilot fuel passage 78 and the main supply fuel passage 70 in the fuel feed arm 64 supplies main fuel to the annular main fuel passage 84. The pilot fuel passage 78 has an outlet 78A which supplies pilot fuel onto a pre-filming surface of the pilot inner air swirler passage 76 and the main fuel passage 84 has an outlet 84A which supplies main fuel onto a pre-filming surface of the main inner air swirler passage 82.

The lean burn fuel injector 62 also comprises a first light guide, for example a first optical fibre, 110 which extends through the fuel feed arm 64 and the first light guide 110 has a distal end 112 arranged to direct light into the main fuel passage 84 in the fuel injector head 66. A second light guide, for example a second optical fibre, 114 extends through the fuel feed arm 64 and the second light guide 114 has a distal end 116 arranged to receive light transmitted through the annular fuel passage 84 from the distal end 112 of the first light guide 110. A light source 120 is arranged to supply light to a proximal end 118 of the first light guide 110 and a light receiver 124 is arranged to collect light at a proximal end 122 of the second light guide 114. The proximal end 118 of the first light guide 110 is connectable to and dis-connectable from the light source 120. The proximal end 122 of the second light guide 114 is connectable to and dis-connectable from the light receiver 124. The distal end 112 of the first light guide 110 has a line of sight into the main fuel passage 84 in the fuel injector head 66 and the distal end 116 of the second light guide 114 has a line of sight into the main fuel passage 84 in the fuel injector head 66. The distal end 112 of the first light guide 110 sealingly locates in an aperture in the main fuel passage 84 in the fuel injector head 66 and is arranged flush with the surface of the main fuel passage 84 in the fuel injector head 66. Similarly, the distal end 116 of the second light guide 114 sealingly locates in an aperture in the main fuel passage 84 in the fuel injector head 66 and is arranged flush with the surface of the main fuel passage 84 in the fuel injector head 66. Alternatively, windows are provided in the apertures in the main fuel passage 84 in the fuel injector head 66 and the distal ends 112 and 116 of the first and second light guides 110 and 114 respectively are placed behind the windows.

The light receiver 124 for example is a photo-electric device arranged to convert the reflected light into an electrical signal. The light receiver 124 is arranged to send electrical signals corresponding to the amplitude of light detected by the second light guide 114 to a recorder 126 which is arranged to record the electrical signals. The light receiver 124 is also arranged to send the electrical signals corresponding to the amplitude of light detected by the second light guide 114 to a processor 128. The processor 128 is arranged to measure the amplitude of the electrical signal corresponding to the light received by the second light guide 114. The processor 128 is arranged to compare the amplitude of the electrical signal corresponding to the reflected light received by the second light guide 114 with a datum amplitude. The processor 128 may be arranged to monitor the amplitude of the electrical signal corresponding to the reflected light received by the second light guide 114 and the processor 128 is arranged to detect a reduction in the amplitude of the electrical signal corresponding to the reflected light received by the second light guide 114 due to coking in the main fuel passage 84 in the fuel injector head 66 of the fuel injector 62.

In operation of the gas turbine engine 10 each lean burn fuel injector 62 supplies fuel into the combustion chamber 16. The inner pilot air-blast fuel injector 72 of each lean burn fuel injector 62 generally supplies pilot fuel into the combustion chamber 16 throughout the operation of the gas turbine engine 10 but the outer main air-blast fuel injector 74 of each lean burn fuel injector 62 only supplies main fuel into the combustion chamber 16 when the total amount of fuel supplied to the combustion chamber 16 is above a predetermined level, at higher power conditions, e.g. full power/take-off for an aero gas turbine engine or cruise for an aero gas turbine engine. During periods of operation of the gas turbine engine 10 when the outer main air-blast fuel injector 74 of each lean burn fuel injector 62 is not supplying fuel into the combustion chamber 16 fuel within the outer main air-blast fuel injectors 74 is stagnant and is subjected to high temperatures within the combustion chamber 16 which may result in the fuel breaking down and forming deposits of carbon within the annular main fuel passage 84 of the outer main air-blast fuel injectors 74.

Thus, a method of detecting coking in the lean burn fuel injector 62 comprises directing light into the annular main fuel passage 84 of the outer main air-blast fuel injector 74 of one or more of the lean burn fuel injectors 62 and detecting light transmitted through the annular main fuel passage 84 and monitoring the light transmitted through the annular passage to detect coking in the annular main fuel passage 84 of the outer main air-blast fuel injector 74 of the lean burn fuel injector 62. In particular the light source 120 supplies light into the proximal end 118 of the first light guide 110, the first light guide 110 transmits the light to the distal end 112 of the first light guide 110 and the distal end 112 of the first light guide 110 directs the light into the annular main fuel passage 84 of the outer main air-blast fuel injector 74 of the lean burn fuel injector 62. The distal end 116 of the second light guide 114 collects light transmitted through the annular main fuel passage 84 of the outer main air-blast fuel injector 74 of the lean burn fuel injector 62 and any collected light is transmitted through second light guide 114 to the proximal end 122 of the second light guide 114. The light receiver 124 converts any detected light into an electrical signal and sends the electrical signal to the recorder 126 and/or the processor 128.

The light directed from the first light guide 110 into the annular main fuel passage 84 of the outer main air-blast fuel injector 74 of the lean burn fuel injector 62 is transmitted for example by reflection(s) off the surfaces of the walls of the annular main fuel passage 84 and is collected by the second light guide 114. However, the amount of light transmitted, e.g. by reflection etc., from the first light guide 110 to the second light guide 114 is reduced due to build-up of carbon on the surfaces of the annular main fuel passage 84, due to build-up of carbon on the distal end 112 of the first light guide 110 and/or the build-up of carbon on the distal end 116 of the second light guide 114 or due to build-up of carbon on the surfaces of the windows placed over the distal end 112 of the first light guide 110 and/or the distal end 116 of the second light guide 114. The reduction in the transmission, reflection, of light may be due to the carbon not being polished and/or because the carbon is black and absorbs light. The reduction in the amplitude of the electrical signal is directly proportional to the level, thickness or depth, of coking built up in the annular main fuel passage 84 of the outer main air-blast fuel injector 74 of the lean burn fuel injector 62.

The method comprises recoding the electrical signals. The method comprises measuring the amplitude of the electrical signal corresponding to the light received by the second light guide. The method comprises comparing the amplitude of the electrical signal corresponding to the light received by the second light guide with a datum amplitude. The method may comprise determining if the amplitude of the electrical signal corresponding to the light received by the second light guide is less than the datum amplitude and removing the fuel injector from the combustion chamber if the amplitude of the electrical signal is less than the datum amplitude.

The method may comprise monitoring the amplitude of the electrical signal corresponding to the light received by the second light guide, detecting a reduction in the amplitude of the electrical signal corresponding to the light received by the second light guide due to coking in the fuel injector. The method may comprise determining if the reduction in the amplitude of the electrical signal corresponding to the light received by the second light guide is greater than a predetermined amount and removing the fuel injector from the combustion chamber if the reduction in the amplitude of the electrical signal is greater than the predetermined amount. The method may record the amplitude of the electrical signal corresponding to the light received by the second light guide when the fuel injector was first used in the combustion chamber. The method may then determine if the reduction in the amplitude of the electrical signal corresponding to the light received by the second light guide is greater than a predetermined percentage of the recorded amplitude of the electrical signal corresponding to the light received by the second light guide when the fuel injector was first used in the combustion chamber.

In a further lean burn fuel injector arrangement the first light guide has a distal end arranged to direct light into the annular pilot fuel passage in the fuel injector head and the second light guide has a distal end arranged to receive reflected light in the annular pilot fuel passage.

Figure 6:
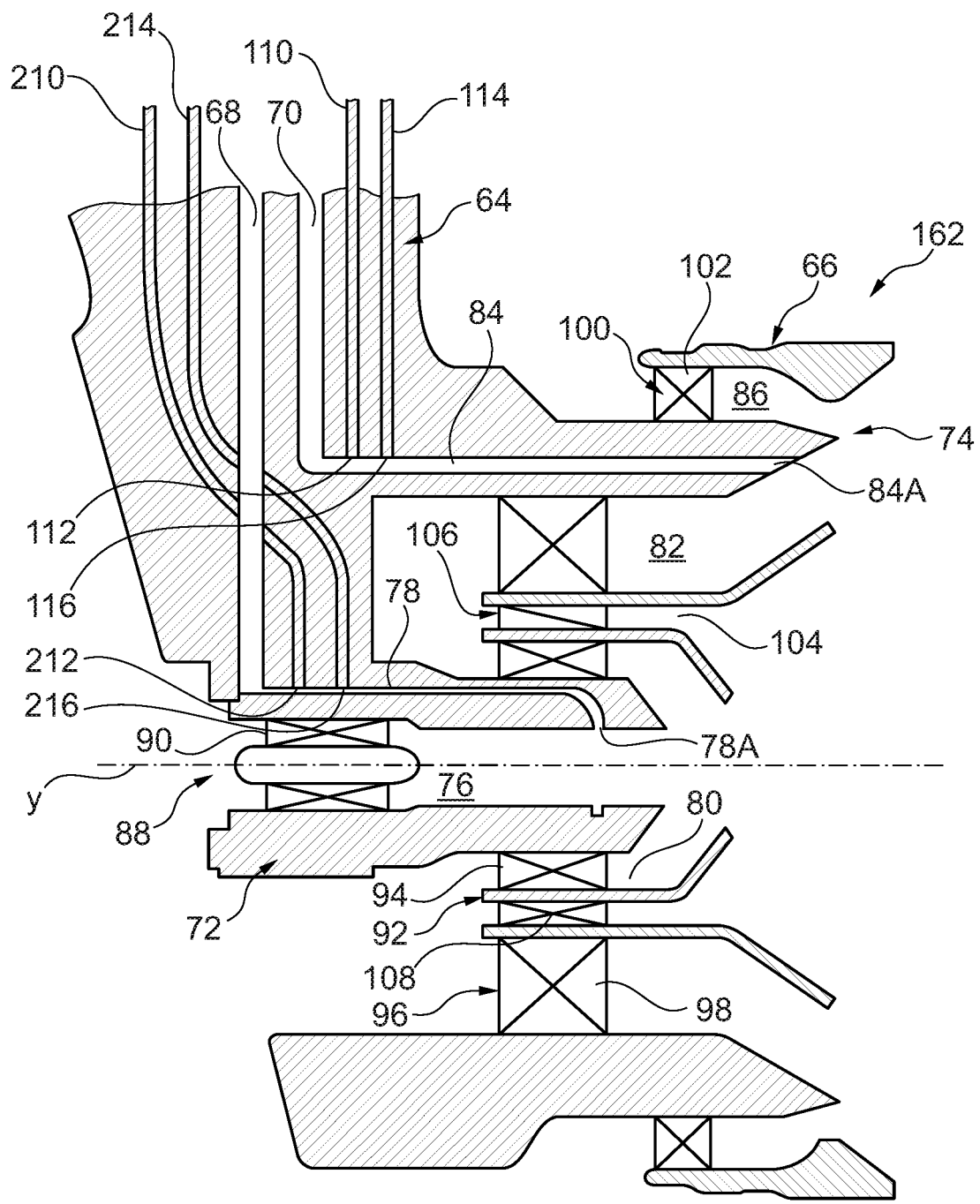
FIG. 6 is a further enlarged cross-section view of an alternative lean burn fuel injector according to the present disclosure.

In another lean burn fuel injector 162, as shown in FIG. 6, a first light guide 110 extends through the fuel feed arm 64 and has a distal end 112 arranged to direct light into the annular main fuel passage 84 in the fuel injector head 66, a first light source is arranged to supply light into a proximal end of the first light guide 110, a second light guide 112 extends through the fuel feed arm 64 and has a distal end 116 arranged to receive reflected light in the annular main fuel passage 84 and a first light receiver is arranged to collect light at a proximal end of the second light guide 114. A third light guide 210 extends through the fuel feed arm 64 and has a distal end 212 arranged to direct light into the annular pilot fuel passage 78 in the fuel injector head 66, a second light source is arranged to supply light into a proximal end of the third light guide 210, a fourth light guide 214 extends through the fuel feed arm 64 and has a distal end 216 arranged to receive reflected light in the annular pilot fuel passage 78 and a second light receiver is arranged to collect light at a proximal end of the fourth light guide 214.

Although the description has referred to a gas turbine engine fuel injector it is equally applicable to fuel injectors for other internal combustion engines, e.g. petrol engine, diesel engine, Wankel engine, etc.

Although the description has referred to a fuel injector being an air blast fuel injector, also known as an air spray fuel injector, it is equally applicable to other types of fuel injector, e.g. a fuel spray fuel injector.

Figure 7:
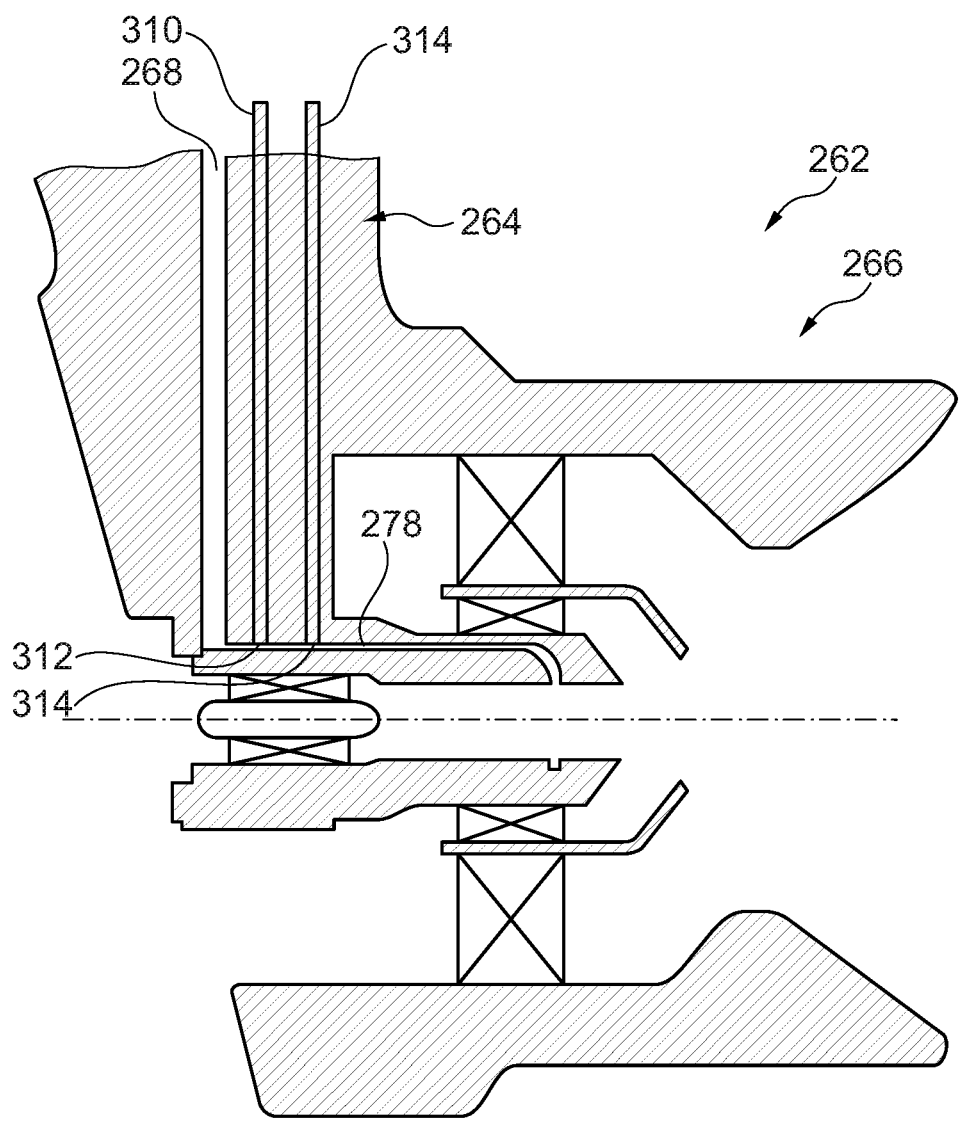
FIG. 7 is a further enlarged cross-section view of a rich burn fuel injector according to the present disclosure.

Although the description has referred to a lean burn fuel injector it is equally applicable to a rich burn fuel injector 262, as shown in FIG. 7. The rich burn fuel injector 262 comprises a fuel feed arm 264 having a fuel supply passage 268 extending there-through and a fuel injector head 266 having an air-blast fuel injector, the air-blast fuel injector comprising, in order radially outwardly, a coaxial arrangement of an inner air swirler passage and an outer air swirler passage, an annular fuel passage 278 being arranged to supply fuel into the inner air swirler passage and/or into the outer air swirler passage. The rich burn fuel injector 266 may have a further air swirler passage arranged coaxially around the outer air swirler passage. A first light guide 310 extends through the fuel feed arm 264 and has a distal end 312 arranged to direct light into the annular main fuel passage 278 in the fuel injector head 266, a first light source is arranged to supply light into a proximal end of the first light guide 310, a second light guide 312 extends through the fuel feed arm 264 and has a distal end 316 arranged to receive reflected light in the annular main fuel passage 78 and a first light receiver is arranged to collect light at a proximal end of the second light guide 314.

It is especially applicable to a combustion chamber which comprises rich burn fuel injectors arranged to provide sector burning, or staged burning, e.g. a first plurality of fuel injectors are supplied with fuel throughout the period of operation of the combustion chamber and a second plurality of fuel injectors are supplied with fuel at high power conditions. One or more of the second plurality of fuel injectors may be provided with the first and second light guides, the light source and the light receiver.

Detecting the amount of coking in the fuel passage(s) of a fuel injector and/or monitoring the increase in the amount of coking in the fuel passage(s) of a fuel injector enables planned maintenance of the fuel injector, e.g. the removal of the fuel injector for cleaning or disposal and the insertion of the cleaned fuel injector or the insertion of a replacement fuel injector. Detecting the amount of coking in the fuel passage(s) of a fuel injector and/or monitoring the increase in the amount of coking in the fuel passage(s) of a fuel injector enables the fuel injector to be removed before there is a failure of the fuel injector due to blockage of the fuel passage due to coking. Detecting the amount of coking in the fuel passage(s) of a fuel injector and/or monitoring the increase in the amount of coking in the fuel passage(s) of a fuel injector enables the operating temperature of the combustion chamber to be adjusted taking into account the amount of coking or the rate of increase in the amount of coking without risking blocking of the fuel passage(s), e.g. if the amount of coking and/or the rate of increase of coking is below a predetermined amount the operating temperature of the combustion chamber may be increased. The optical fibre light guides are made of a material suitable for operation at temperatures experienced by the fuel injector(s).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fuel injector comprising a fuel feed arm and a fuel injector head, the fuel injector head having a fuel passage, the fuel feed arm having a fuel supply passage in fluid communication with the fuel passage in the fuel injector head, a first light guide extending through the fuel feed arm and having a distal end arranged to direct light into the fuel passage in the fuel injector head, a second light guide extending through the fuel feed arm and having a distal end arranged to receive light in the fuel passage in the fuel injector head, in operation a proximal end of the first light guide being connectable to a light source arranged to supply light and a proximal end of the second light guide being connectable to a light receiver.

2. A combustion chamber comprising a fuel injector, the fuel injector comprising a fuel feed arm and a fuel injector head, the fuel injector head having a fuel passage, the fuel feed arm having a fuel supply passage in fluid communication with the fuel passage in the fuel injector head, a first light guide extending through the fuel feed arm and having a distal end arranged to direct light into the fuel passage in the fuel injector head, a second light guide extending through the fuel feed arm and having a distal end arranged to receive light transmitted through the fuel passage in the fuel injector head from the distal end of the first light guide, a light source arranged to supply light to a proximal end of the first light guide and a light receiver arranged to collect light at a proximal end of the second light guide.

3. A combustion chamber as claimed in claim 2, wherein the light receiver is a photo-electric device arranged to convert the received light into an electrical signal.

4. A combustion chamber as claimed in claim 3, wherein a recorder is arranged to record the electrical signal.

5. A combustion chamber as claimed in claim 3, wherein a processor is arranged to measure the amplitude of the electrical signal corresponding to the light received by the second light guide.

6. A combustion chamber as claimed in claim 5, wherein the processor is arranged to compare the amplitude of the electrical signal corresponding to the light received by the second light guide with a datum amplitude.

7. A combustion chamber as claimed in claim 3, wherein the processor is arranged to monitor the amplitude of the electrical signal corresponding to the light received by the second light guide, the processor is arranged to detect a reduction in the amplitude of the electrical signal corresponding to the light received by the second light guide due to coking in the fuel injector.

8. A combustion chamber as claimed in claim 2, wherein the fuel injector is a gas turbine fuel injector.

9. A combustion chamber as claimed in claim 2, wherein the fuel injector is an air blast fuel injector.

10. A combustion chamber as claimed in claim 2, wherein the fuel injector is a rich burn fuel injector, the rich burn fuel injector comprises:
a fuel feed arm having a fuel supply passage extending there-through,
a fuel injector head having an air-blast fuel injector, the air-blast fuel injector comprising, in order radially outwardly, a coaxial arrangement of an inner air swirler passage and an outer air swirler passage, an annular fuel passage being arranged to supply fuel into the inner air swirler passage and/or into the outer air swirler passage.

11. A combustion chamber as claimed in claim 2, wherein the fuel injector is a lean burn fuel injector, the lean burn fuel injector comprises:
a fuel feed arm having a pilot fuel supply passage extending there-through and a main fuel supply passage extending there-through,
a fuel injector head having a coaxial arrangement of an inner pilot air-blast fuel injector and an outer main air-blast fuel injector, the outer main air-blast fuel injector being arranged coaxially radially outwardly of the inner pilot air-blast fuel injector,
the inner pilot air-blast fuel injector comprising, in order radially outwardly, a coaxial arrangement of a pilot inner air swirler passage and a pilot outer air swirler passage, an annular pilot fuel passage being arranged to supply pilot fuel into the pilot inner air swirler passage and/or into the pilot outer air swirler passage,
the outer main air-blast fuel injector comprising, in order radially outwardly, a coaxial arrangement of a main inner air swirler passage and a main outer air swirler passage, an annular main fuel passage being arranged to supply main fuel to the main inner air swirler passage and/or the main outer air swirler passage.

12. A combustion chamber as claimed in claim 11, wherein the first light guide having a distal end arranged to direct light into the annular main fuel passage in the fuel injector head and the second light guide having a distal end arranged to receive light in the annular main fuel passage.

13. A combustion chamber as claimed in claim 11, wherein the first light guide having a distal end arranged to direct light into the annular pilot fuel passage in the fuel injector head and the second light guide having a distal end arranged to receive light in the annular pilot fuel passage.

14. A combustion chamber as claimed in claim 11, wherein the lean burn fuel injector having a first light guide extending through the fuel feed arm and having a distal end arranged to direct light into the annular main fuel passage in the fuel injector head, a first light source arranged to supply light into a proximal end of the first light guide, a second light guide extending through the fuel feed arm and having a distal end arranged to receive light in the annular main fuel passage and a first light receiver arranged to collect light at a proximal end of the second light guide, a third light guide extending through the fuel feed arm and having a distal end arranged to direct light into the annular pilot fuel passage in the fuel injector head, a second light source arranged to supply light into a proximal end of the third light guide, a fourth light guide extending through the fuel feed arm and having a distal end arranged to receive light in the annular pilot fuel passage and a second light receiver arranged to collect light at a proximal end of the fourth light guide.

15. A method of detecting coking in a fuel injector, wherein the fuel injector being arranged in a combustion chamber, the fuel injector comprising a fuel feed arm and a fuel injector head, the fuel injector head having a fuel passage, the fuel feed arm having a fuel supply passage in fluid communication with the fuel passage in the fuel injector head, the method comprising directing light into the fuel passage in the fuel injector head, detecting light transmitted through the fuel passage in the fuel injector head and monitoring the light transmitted through the fuel passage in the fuel injector head to detect coking in the fuel injector.

16. A method as claimed in claim 15, comprising converting the light that has been detected to an electrical signal.

17. A method as claimed in claim 16, comprising recording the electrical signal.

18. A method as claimed in claim 16, comprising measuring the amplitude of the electrical signal corresponding to the light that has been detected.

19. A method as claimed in claim 18, comprising comparing the amplitude of the electrical signal corresponding to the light that has been detected with a datum amplitude.

20. A method as claimed in claim 16, comprising monitoring the amplitude of the electrical signal corresponding to the light that has been detected, detecting a reduction in the amplitude of the electrical signal corresponding to the light that has been detected due to coking in the fuel injector.

* * * * *